United States Patent [19]
Kunert et al.

[11] 3,783,482
[45] Jan. 8, 1974

[54] METHOD OF FILLING ANTIFRICTION BEARINGS

[75] Inventors: Karlheinz Kunert; Herbert Kozalla, both of Schweinfurt, Germany

[73] Assignee: Kugelfischer Georg Schafer & Co., Schweinfurt, Germany

[22] Filed: Jan. 20, 1972

[21] Appl. No.: 219,295

[30] Foreign Application Priority Data
Jan. 28, 1971 Germany.......................... 2104063

[52] U.S. Cl............................................. 29/148.4 A
[51] Int. Cl............................................. B23p 11/00
[58] Field of Search ................ 29/148.4 A, 148.4 R, 29/201; 308/198

[56] References Cited
UNITED STATES PATENTS

| | | | |
|---|---|---|---|
| 822,723 | 6/1906 | Conrad | 308/198 |
| 838,303 | 12/1906 | Conrad | 29/148.4 A |
| 2,633,627 | 4/1953 | Olmstead | 29/148.4 A |
| 2,885,767 | 5/1959 | Barish | 29/148.4 A |

FOREIGN PATENTS OR APPLICATIONS

| | | | |
|---|---|---|---|
| 11,353 | 5/1908 | Great Britain | 29/148.4 A |
| 393,053 | 10/1908 | France | 29/148.4 A |
| 241,539 | 5/1908 | Germany | 29/148.4 A |
| 443,593 | 7/1925 | Germany | 29/148.4 A |

*Primary Examiner*—Thomas H. Eager
*Attorney*—Richard K. Stevens et al.

[57] ABSTRACT

A method is disclosed for introducing rolling elements between the inner and outer rings of an antifriction bearing, each of which is provided with two uninterrupted shoulders, wherein the inner and outer rings are shifted to a relative eccentricity and at least one rolling element is introduced between the two rings at the widest place in the center of the crescent-shaped gap, whereupon the rings are re-shifted into a position concentric with respect to each other and then the outer ring is elastically compressed by two oppositely directed forces to form an ellipse said forces being applied to said outer ring in the region of the rolling element which has been introduced and in the region diametrically opposite the region of the rolling element, and the elastic deformation being effected until the shoulders of the two rings are at such a distance apart in the two regions of the small radii of curvature of said ellipse as to permit the introduction of the remaining rolling elements which are then introduced.

2 Claims, 1 Drawing Figure

PATENTED JAN 8 1974  3,783,482
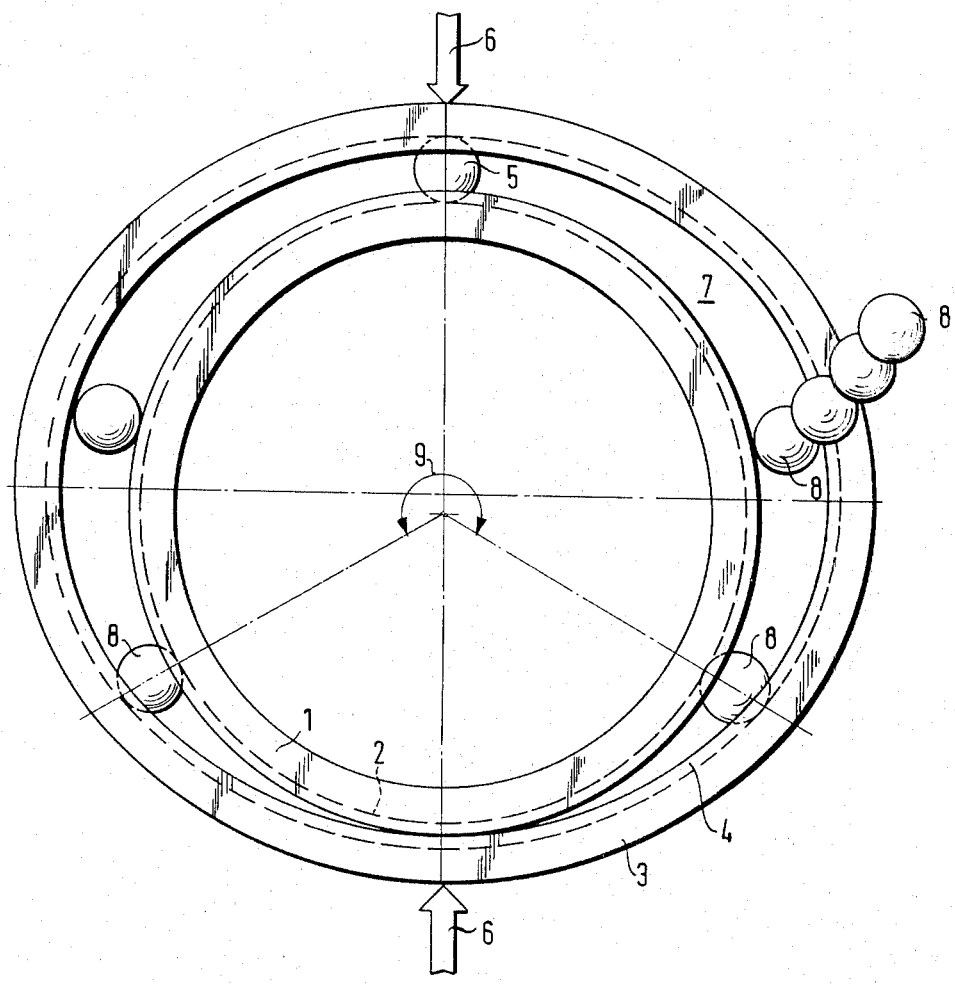

METHOD OF FILLING ANTIFRICTION BEARINGS

The present invention relates to a method of introducing rolling bodies between the inner and outer rings of an anti-friction bearing, each of said rings being provided with two shoulders, without introduction grooves, and particularly in the case of a ratio of pitch circle diameter to the diameter of the rolling bodies of more than about 10, the rolling solids being introduced by two forces acting in opposition after elastic deformation of the outer ring into the shape of an ellipse.

The desire to introduce the largest possible number of rolling bodies into an antifriction bearing is based on the fact that its load-carrying capacity is thereby increased. In the case of antifriction bearings having rings which have two shoulders and no filling groove, there are certain limits as to the number of rolling solids that can be introduced. Many attempts and proposals have already been made for pushing this limit upward, i.e., of increasing the number of rolling solids introduced into the bearing, in order to increase the load-bearing capacity of the antifriction bearing.

For example, in the case of deep-groove ball bearings it is known for the introduction of the balls to dispose the inner ring eccentrically with respect to the outer ring, and in such a manner, in the limiting case, that the two rings contact at their shoulders, whereby a crescent-shaped gap is formed between the two rings. The outer ring is then elastically deformed into the shape of an ellipse by two external oppositely directed forces lying on the same line of action and extending through the center point of the two rings. In this connection, the crescent-shaped gap narrows slightly at the widest place but only to such an extent that balls can still be introduced there between the shoulders, while the tips of the crescent-shaped gap broaden radially. By this method it is possible to obtain filling angles, i.e., the angle between the center of the first ball and the center of the last ball of the introduced balls pushed together on the ball pitch circle) of not more than about 210°. After the uniform distribution of the balls between the inner and outer rings and their concentric adjustment, the cage is installed.

In order further to increase the filling angle of deep-groove ball bearings, it is also known, in addition to deforming the outer ring, also to deform the inner ring ovally. In this connection forces act on the inner ring in such a manner that the major ellipse axes of the two rings caused by the elastic deformation are turned 90° with respect to each other. In detail, one proceeds by inserting the largest possible number of balls between the two rings while lying flat on a support after eccentric displacement with respect to each other until the shoulders of the two rings rest against each other at one point. Thereupon at least one additional ball is inserted between the two raceway rings at the place where the distance between the shoulders thereof is greatest. For this purpose the balls which have already been introduced are divided into two groups and the additional ball or balls are placed between them with slight pressure. All the balls then distribute themselves in such a manner that merely the first and the last balls rest against the base of the raceways of the inner and outer rings, while only the center points of the remaining balls between them lie between the inner edges of the ring shoulders. Thereupon the inner and outer rings are elastically deformed in the manner indicated so that all the balls which habe been introduced travel in the grooved raceways of the outer and inner rings (see German Pat. No. 443,593).

This method is complicated and expensive due to the additional devices that are necessary, and moreover the increase in the angle of filling thus obtainable is only slight.

In another method of filling deep-groove ball bearings, it has been attempted to increase the number of balls which can be introduced in such manner that after the introduction of the largest possible number of balls between the two rings which are displaced eccentrically with respect to each other and the distributing of them on both sides of the place of introduction, a protruding, nonround pin, particularly of elliptical cross section, of a lever-like tool is introduced between the two rings alongside the place of introduction of the balls and then turned 90° so that the major elliptical axis of the pin becomes radial and both rings are elastically deformed, i.e. pressed away from each other. The nonround pin of the tool exerts high forces on the inner and outer rings. The effect of these forces extends through the balls introduced and particularly the two balls which lie closest to the narrowest point between the eccentrically arranged rings. Slight plastic deformations of the raceways of the inner and outer rings may disadvantageously occur in this connection and the balls may furthermore possibly be damaged, so that the bearing is destroyed even at the time of its mounting (see German Pat. No. 241,539).

The object of the present invention is to eliminate the above-mentioned disadvantages and to provide a method of filling antifriction bearings which makes it possible to introduce an increased number of rolling solids of revolution and in which all plastic deformation of the raceways as well as of the rolling solids of revolution is excluded.

This result is obtained with a method of the aforementioned type, characterized in accordance with the present invention by the fact that after the preliminary eccentric displacement with respect to each other of the inner and outer rings, at least one solid of revolution is introduced between the two rings at the widest point in the center of the crescent shaped gap and then after the return of the inner ring into a concentric position with respect to the outer ring the latter is deformed by forces acting in the region of the solid of revolution introduced and diametrically opposite on the outer ring to such an extent that the shoulders of the two rings are at a sufficient distance apart in the region of the small radii of curvature of the ellipse of deformation as to make easily possible the introduction of the remaining solids of revolution.

Therefore first of all, for a simple adjustment of the distance between the rings after their displacement with respect to each other, only one solid of revolution is introduced between the inner and outer rings, and the two rings are then moved into the concentric position with respect to each other. Thereupon two oppositely directed forces lying on the same line of action are caused to act from the outside of the outer ring in the region of the solid of revolution already introduced and diametrically opposite same, said forces deforming the outer ring into approximately the shape of an ellipse. This elastic deformation is effected to such an extent that the flanges of the inner and outer rings are moved sufficiently far apart in the region of the small radii of curvature of the ellipse of deformatioon that the remaining solids of revolution can be readily introduced at these two places. Further deformation does not result in any additional advantages. As soon as the lateral openings are so large that solids of revolution can be introduced, the largest filling angle is reached. With a ratio of pitch circle diameter to the diameter of the solids of revolution of more than about 10 there are obtained filling angles of up to about 240°, without any danger of excessive stressing or even plastic deformation of the solids of revolution and/or raceways.

One embodiment of the present invention will be described by way of the example below with particular reference to the accompanying drawing the sole figure of which is an axial top view of the two rings of a deep-groove ball bearing while it is being filled with balls in accordance with the invention.

An inner ring 1 having two lateral shoulders 2 is arranged within an outer ring 3 which also has two lateral shoulders 4. Neither of the two rings 1 and 3 has a filling groove.

In accordance with this invention, the two rings 1 and 3 are first of all briefly supported eccentrically with respect to each other so that a ball 5 can be introduced and brought into contact with the outer and inner rings 3 and 1 resepctively. After this adjustment, to the outer ring 3 there are applied two oppositely directed forces lying on the same line of action passing through the centers of the two rings 1 and 3 and dforming the latter elastically so as to form an ellipse. The one force 6 acts on the outside of the outer ring 3 in the region of the ball 5 which was first introduced and the second force 6 acts on the ring 3 diametrically opposite.

The elastic deformation is brought about to such an extent as to produce a radial distance between the shoulders 2 and 4 of the rings 1 and 3 in the two regions 7 of the small radii of curvature of the ellipse as to make readily possible the introduction of the remaining balls 8 at those regions. In this way there is at the same time obtained a maximum filling angle 9 for the balls of up to 240°.

The method of this invention is of particular advantage when the shoulders 2 and 4 of the rings 1 and 3 are low and if, for the purpose of easier deformability, the cross section of the outer ring 3 is small as compared with the pitch circle diameter.

The method of this invention provides the same advantages also for the mounting of roller bearings instead of ball bearings as just described.

Instead of the elastic deformation of the outer ring 3, the inner ring 1 can also be elastically deformed into an oval or elliptical shape with similar advantages.

What is claimed is:

1. A method for introducing rolling elements between the inner and outer rings of an antifriction bearing, each of which is provided with two uninterrupted shoulders, wherein the inner and outer rings are shifted to a relative eccentricity and at least one rolling element is introduced between the two rings at the widest place in the center of the crescent-shaped gap, whereupon the rings are re-shifted into a position concentric with respect to each other and then the outer ring is elastically compressed by two oppositely directed forces to form an ellipse said forces being applied to said outer ring in the region of the rolling element which has been introduced and in the region diametrically opposite the region of the rolling element, and the elastic deformation being effected until the shoulders of the two rings are at such a distance apart in the two regions of the small radii of curvature of said ellipse as to permit the introduction of the remaining rolling elements which are then introduced.

2. A method as defined in claim 1 wherein the ratio of the pitch circle diameter of the antifriction bearing to the diameter of the rolling elements is more than about 10.

* * * * *